(12) United States Patent
Merkel et al.

(10) Patent No.: US 11,363,559 B2
(45) Date of Patent: Jun. 14, 2022

(54) METHOD AND TEST SYSTEM FOR TESTING AN INTEGRATED ACCESS BACKHAUL NODE

(71) Applicant: Rohde & Schwarz GmbH & Co. KG, Munich (DE)

(72) Inventors: Sandra Merkel, Munich (DE); Daniela Raddino, Munich (DE); Juergen Schlienz, Munich (DE); Rabih El-Masri, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 71 days.

(21) Appl. No.: 16/883,586

(22) Filed: May 26, 2020

(65) Prior Publication Data
US 2021/0377902 A1   Dec. 2, 2021

(51) Int. Cl.
*H04W 64/00* (2009.01)
*H04W 16/26* (2009.01)
*H04L 41/0896* (2022.01)
*H04L 41/044* (2022.01)

(52) U.S. Cl.
CPC ......... *H04W 64/003* (2013.01); *H04L 41/044* (2013.01); *H04L 41/0896* (2013.01); *H04W 16/26* (2013.01)

(58) Field of Classification Search
CPC ............................ H04W 64/003; H04W 16/26; H04L 41/0896; H04L 41/044
See application file for complete search history.

(56) References Cited

U.S. PATENT DOCUMENTS

| 2021/0029736 A1* | 1/2021 | Kim ................. H04W 74/0833 |
| 2021/0092764 A1* | 3/2021 | Abedini .............. H04W 16/32 |
| 2021/0159968 A1* | 5/2021 | Fujishiro .............. H04L 5/0055 |

FOREIGN PATENT DOCUMENTS

| WO | 2020/056364 A1 | 3/2020 |
| WO | 2020/065039 A1 | 4/2020 |

* cited by examiner

*Primary Examiner* — Walli Z Butt
*Assistant Examiner* — Shawn D Miller
(74) *Attorney, Agent, or Firm* — Christensen O'Connor Johnson Kindness PLLC

(57) ABSTRACT

A method of testing an Integrated Access Backhaul (IAB) node is disclosed, the method including: providing a device under test as well as a test equipment for testing the device under test, wherein the device under test corresponds to an Integrated Access Backhaul (IAB) node to be tested; simulating at least one Integrated Access Backhaul (IAB) donor by the test equipment; simulating a participant by the test equipment, the participant being connected with the device under test; establishing at least one connection between the device under test and the test equipment, wherein a backhaul link is established with the test equipment; configuring link resources for the device under test via configuration information by the test equipment; gathering reception information by the test equipment; and combining the configuration information with the reception information by the test equipment in order to verify correct resource utilization of the device under test. Further, a test system for testing an Integrated Access Backhaul (IAB) node is described.

20 Claims, 2 Drawing Sheets

METHOD AND TEST SYSTEM FOR TESTING AN INTEGRATED ACCESS BACKHAUL NODE

FIELD OF THE DISCLOSURE

Embodiments of the present disclosure relate generally to a method of testing an Integrated Access Backhaul (IAB) node. Further, embodiments of the present disclosure relate to a test system for testing an Integrated Access Backhaul (IAB) node.

BACKGROUND

In a hierarchical telecommunications network, a backhaul portion of the network comprises intermediate links between a core network, also called backbone network, and small subnetworks at the edge of the network.

In modern telecommunication standards, particularly 5G or New Radio (NR) networks, an Integrated Access Backhaul (IAB) technology, also called Integrated Access and Backhaul (IAB) technology, is used to connect a base station over-the-air (OTA), namely without a cable connection, with a mobile radio cell. Put differently, many radio cells can be networked with each other by using mobile radio frequencies for backhaul purposes. In fact, the respective cells, for instance NR gNBs, can be interconnected without fiber optics.

The cell used to set up the Integrated Access and Backhaul connection, also known as donor gNB or rather Integrated Access Backhaul (IAB) donor, typically has a powerful connection, thereby ensuring Backhaul functionality of the network.

In general, the Backhaul technology shall overcome deployment costs of ultra-dense networks by realizing wireless backhaul links to relay the access traffic in an appropriate manner.

Since the number of nodes enabled for backhaul increases, there is a need for testing such nodes in a cost-efficient and simple manner.

SUMMARY

The present disclosure provides a method of testing an Integrated Access Backhaul node. In an embodiment, the method comprises the steps of:

providing a device under test as well as a test equipment for testing the device under test, wherein the device under test corresponds to an Integrated Access Backhaul (IAB) node to be tested;

simulating at least one Integrated Access Backhaul (IAB) donor by the test equipment;

simulating a participant by the test equipment, the participant being connected with the device under test;

establishing at least one connection between the device under test and the test equipment, wherein a backhaul link is established with the test equipment;

configuring link resources for the device under test via configuration information by the test equipment;

gathering reception information by the test equipment; and combining the configuration information with the reception information by the test equipment in order to verify correct resource utilization of the device under test.

Further, embodiments of the present disclosure provide a test system for testing an Integrated Access Backhaul node. In an embodiment, the test system comprises a test equipment and a device under test established by an Integrated Access Backhaul (IAB) node. A connection is established between the device under test and the test equipment. The test equipment is configured to simulate at least one Integrated Access Backhaul (IAB) donor and a participant connected with the device under test. The test equipment is configured to establish at least one connection between the device under test and the test equipment, wherein a backhaul link is established with the test equipment. The test equipment is established to configure link resources for the device under test via configuration information. The test equipment is established to gather reception information. The test equipment is configured to combine the configuration information with the reception information in order to verify correct resource utilization of the device under test.

Accordingly, a method as well as a test system are provided that ensure cost-efficient and simple testing of an IAB node that corresponds to the device under test during the respective testing. The test equipment that simulates at least one IAB donor may be established by at least one radio communication tester, for example several radio communication testers that may communicate with each other. In some embodiments, the test equipment may be established by a single platform or rather several platforms interconnected with each other.

The device under test, namely the Integrated Access Backhaul node to be tested, establishes at least one link, namely the backhaul link, with the test equipment when the at least one connection is established between the device under test and the test equipment.

Furthermore, the link resources for the device under test are configured by the test equipment wherein configuration information is used in order to configure the device under test with respect to the test scenario applied. In general, the respective configuration may have an influence on hard resources and/or soft resources of the device under test.

The test equipment which has configured the device under test previously, for example its link resources, is also enabled to gather reception information from the device under test and/or the participant simulated in order to verify correct resource utilization of the device under test. For this purpose, the test equipment combines the configuration information used for configuring the link resources with the reception information gathered. The respective steps of gathering, combining and verifying may be performed by the test equipment.

An aspect provides that the connection established concerns a radio frequency connection. In some embodiments, a radio frequency connection is established between the device under test and the test equipment, for example with the Integrated Access Backhaul donor simulated and the participant simulated. Thus, the respective connection established between the test equipment and the device under test corresponds to an over-the-air connection used for testing the IAB node under real world conditions. The radio frequency (RF) connection concerns a signaling connection.

Another aspect provides that the device under test comprises a mobile termination (MT) circuit or module and a distributed circuit or unit (DU) module. The mobile termination module and the distributed unit module ensure the respective functionalities of the Integrated Access Backhaul node. The mobile termination module is configured to maintain a wireless backhaul connection towards an upstream participant, for instance an IAB node or an IAB donor. The distributed unit module is configured to provide a connection, for example an access connection, to a user equipment and/or a downstream participant such as a mobile termination module of another IAB node.

Accordingly, a backhaul link and an access link may be established between the device under test and the test equipment when establishing the connection. Hence, these links both are associated with the test equipment. The backhaul link and the access link may be established simultaneously.

In some embodiments, the mobile termination module establishes the backhaul link with the test equipment, wherein the distributed unit module establishes an access link with the test equipment. As mentioned above, the Integrated Access Backhaul node to be tested comprises at least two different modules that fulfill different functionalities during operation of the IAB node. Accordingly, the different modules are used to establish different links with the test equipment, namely the respective components of the network which are simulated by the test equipment.

Generally, the link resources configured by the test equipment, for example the Integrated Access Backhaul donor simulated, concern at least one of backhaul link resources and access link resources, namely the backhaul link resources and/or the access link resources. Therefore, the link resources needed for the respective test scenario are configured appropriately.

The backhaul link may be established between the mobile termination module and the at least one Integrated Access Backhaul donor simulated. The access link may be established between the distributed unit module and the participant simulated. Therefore, the different links provided when establishing the respective connection between the test equipment and the device under test, namely the Integrated Access Backhaul node to be tested, are unambiguously associated with one of the respective components simulated by the test equipment, namely the IAB donor or rather the participant.

According to an embodiment, the participant stimulated corresponds to a user equipment or an Integrated Access Backhaul participant. The user equipment corresponds to a downstream participant of the entire test system, for example the network simulated by the test equipment.

For instance, the Integrated Access Backhaul participant is a further Integrated Access Backhaul node or a further Integrated Access Backhaul donor. Thus, the IAB participant may relate to a downstream participant or rather an (upcoming) upstream participant in case of switching the Backhaul link from the Integrated Access Backhaul donor to the further Integrated Access Backhaul donor. The downstream further Integrated Access Backhaul node may be connected via the access link established, namely with the distributed unit (DU) module. The further Integrated Access Backhaul donor may be connected via a (re-established) Backhaul link, namely the mobile termination (MT) module.

Further, a first test scenario may be performed that comprises radio frequency testing of the device under test when the backhaul link and an access link are on same bands. This first test scenario relates to a time division duplex (TDD) testing since the respective links, namely the backhaul link and the access link, are assigned to the same frequency bands.

The first test scenario may include the configuration of time resources of the device under test by the test equipment. The respective time resources allocated to the device under test may be configured by the test equipment.

In the first test scenario, the test equipment may include configuration of the device under test by the test equipment, for example the Integrated Access Backhaul donor simulated. The configuration concerns time resources used for multiplexing in TDD for the backhaul link and/or the access link.

Therefore, the respective multiplexing capabilities of the device under test may be verified when the configuration information is combined with the reception information by the test equipment in order to verify correct resource utilization of the device under test. In other words, the test equipment verifies whether the multiplexing was carried out correctly by the device under test.

In some embodiments, the test scenario may include changing the configuration of time resources. Thus, the respective time resources used may be changed during the testing in order to verify a dynamic behavior of the device under test. However, the respective links established, for example the access link, are maintained when changing the configuration of time resources.

In addition, a second test scenario may be performed that comprises radio frequency testing of the device under test when the backhaul link and the access link are on different bands. The second test scenario relates to a frequency division duplex (FDD) testing of the device under test. Thus, the different links established are associated to different frequency bands, namely different frequency channels.

Further, a third test scenario may be performed that comprises data transmission from the at least one Integrated Access Backhaul donor simulated via the device under test to the participant simulated, wherein the device under test acts as a relay node. The device under test, namely the Integrated Access Backhaul node to be tested, may be used as a hop node or rather a relay node in the third test scenario. The respective data is forwarded from the test equipment, for example the IAB donor simulated, to a participant simulated by the test equipment, for instance a further IAB node, also called end node. The another IAB node corresponds to a downstream IAB component. The data is forwarded to the participant simulated via the device under test that acts the hop node or rather the relay node. In the third test scenario, a radio frequency or rather signaling connection between the device under test and the test equipment is established, for example the Integrated Access Backhaul donor simulated and the participant simulated. The test equipment may also configure the device under test, for example the link resources, appropriately.

The device under test used as a hop or relay node uses its mobile termination module for establishing the backhaul link with the IAB donor simulated, wherein the device under test uses its distributed unit module for establishing the access link with the participant simulated, namely the further IAB node.

Furthermore, a fourth test scenario may be performed that comprises releasing the backhaul link with the at least one Integrated Access Backhaul donor simulated and establishing a new backhaul link with a participant simulated. The respective participant simulated may correspond to another IAB donor such that the device under test, namely the Integrated Access Backhaul node to be tested, may change its upstream IAB donor. This scenario is tested by the fourth test scenario appropriately. The test equipment also configures the device under test for the fourth test scenario, namely the link resources.

In addition, the device under test, for example its distributed unit module, may be configured both statically and dynamically. The respective allocation of symbols to slots provided by the telecommunication standard may be static or dynamic.

For instance, a static configuration defines for each symbol the respective setting of the device under test. In some embodiments, a communication direction, for instance Downlink, Uplink or Flexible (Downlink or Uplink), and/or an availability attribute, for instance Hard, Soft or Not Available, are/is defined.

In some embodiments, the mobile termination (MT) time-domain resources are configured as Downlink, Uplink, or Flexible, indicating the possible transmission direction of a given resource. Similar to the MT module time-domain resources, DU time-domain resources are configured as Downlink, Uplink, or Flexible, indicating the allowed transmission direction for a given resource.

Moreover, the DU module resources are further configured as Hard, Soft, or Not Available. A hard DU resource is available in the configured transmission direction(s) without the IAB node having to consider the impact on the corresponding MT resources. This implies that MT resources corresponding to a hard DU resource (of the same IAB node) are not available, as it cannot be guaranteed that the MT can properly transmit/receive on these resources. In contrast to hard resources, a soft DU resource can only be used if that does not impact the ability of the MT module to transmit and/or receive according to its configuration and scheduling.

In general, not available resources cannot be used by the device under test during the respective testing. Put differently, the test equipment verifies that the respective symbol to be transmitted is not used.

As mentioned above, any hard resources can be used by the DU module without an available indication of the IAB donor.

The hard resources may correspond to OFDM symbols, where uplink, downlink or flexible symbols are always available on the access link. Thus, the test equipment verifies the correct usage of the corresponding symbol.

Another aspect provides that the static configuration is set when establishing the connection. Hence, the respective configuration is a pre-defined one that is done at the beginning of the IAB node link establishment.

According to another aspect, a dynamic configuration provides an indication of availability for soft resources. The dynamic configuration takes place for each slot in a frame of the signal used for testing purposes. Generally, the possibility to configure soft DU resources allows an improved dynamic separation between the DU and MT resource allocation.

Further, the device under test may be enabled to allocate a downlink transmission and an uplink transmission if a soft resource is indicated as being available. Accordingly, the test equipment is enabled to verify the correct usage of the symbol.

Moreover, a soft resource indicated as being not available cannot be used for downlink or rather uplink transmission. The test equipment is also enabled to verify that the respective symbol is not used which is associated with the soft resource being not available.

Another aspect provides that a radio frequency signal is used for testing the device under test, wherein the radio frequency signal comprises at least one frame, wherein the at least one frame comprises ten sub-frames, and wherein one sub-frame has at least one slot. Each slot can be used for transmitting a respective symbol in accordance with the respective configuration.

In general, the main purpose of the soft resource availability indication in IAB is to enable dynamic resource multiplexing between backhaul and access links associated with the device under test. This can be verified by the method and the test system appropriately since the configuration information and the reception information are used.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
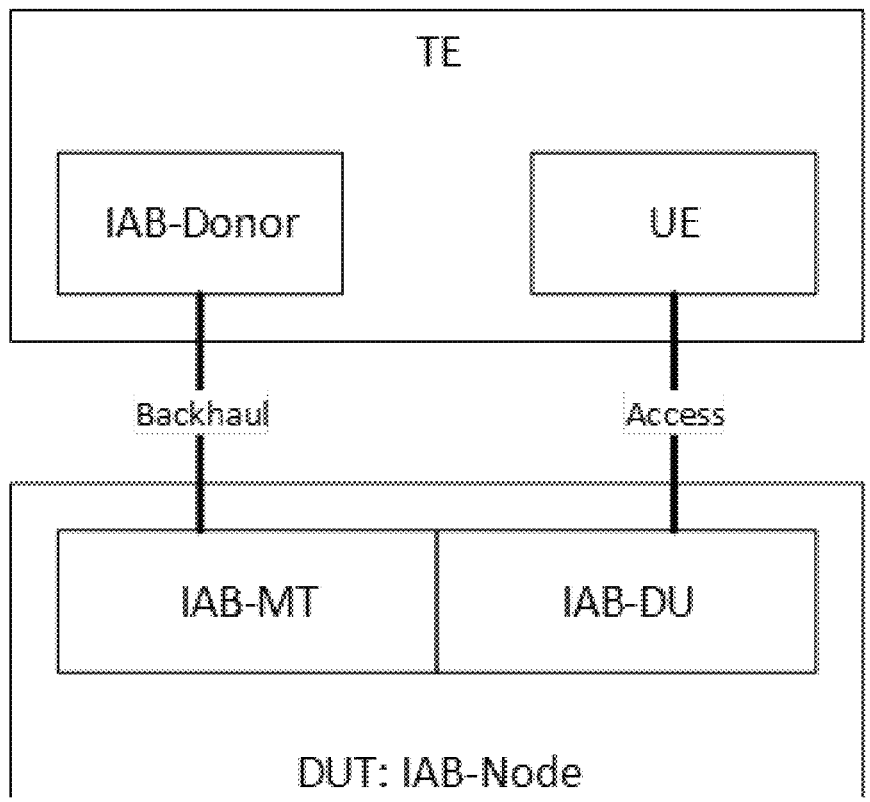
FIG. 1 schematically shows a test system according to an embodiment of the present disclosure which can be used for performing a first test scenario and a second test scenario.

FIG. 1 schematically shows a test system 10 for testing Integrated Access Backhaul functionality. Generally, the test system 10 comprises a test equipment 12 ("TE") and a device under test 14 ("DUT") that is established by an Integrated Access Backhaul node ("IAB-Node") to be tested. A connection 16 is established between the device under test 14 and the test equipment 12 that is a radio frequency (RF) or signaling connection, namely a over-the-air (OTA) connection.

In general, the test equipment 12 is configured to simulate at least one Integrated Access Backhaul donor 18 ("IAB-Donor") as well as a participant 20 that is connected with the device under test 14 over-the-air (OTA). In the shown embodiment, the participant 20 simulated corresponds to a user equipment ("UE"). Hence, two different components are simulated by the test equipment 12, namely the IAB donor 18 and the participant 20.

The device under test 14, namely the IAB node under test, comprises a mobile termination circuit or module 22 ("IAB-MT") and a distributed unit circuit or module 24 ("IAB-DU") that are used to establish respective links with the test equipment 12.

In some embodiments, the mobile termination module 22 establishes a backhaul link 26 with the test equipment 12, for example the Integrated Access Backhaul donor 18 simulated by the test equipment 12, whereas the distributed unit module 24 establishes an access link 28 with the test equipment 12, namely the participant 20 simulated by the test equipment 12.

In general, the different links, namely the backhaul link 26 and the access link 28, are associated with the connectionl 6 established between the device under test 14 and the test equipment 12 as discussed above.

The test system 10 shown can be used in a first test scenario that comprises radio frequency testing of the device under test 14 when the backhaul link 26 and the access link 28 established are on same bands of the RF connection 16. This relates to a time division duplex (TDD) testing.

The respective first test scenario includes the configuration of time resources of the device under test 14 by the test equipment 12, for example the Integrated Access Backhaul donor 18.

Hence, link resources of the device under test 14 are configured via configuration information by the test equipment 12, for example the at least one Integrated Access Backhaul donor 18 simulated.

The link resources of the device under test 14 concern the resources used to establish the respective links with the test equipment 12, namely the backhaul link 26 and the access link 28. Accordingly, the link resources comprise backhaul link resources as well as access link resources.

Figures 3, 4:
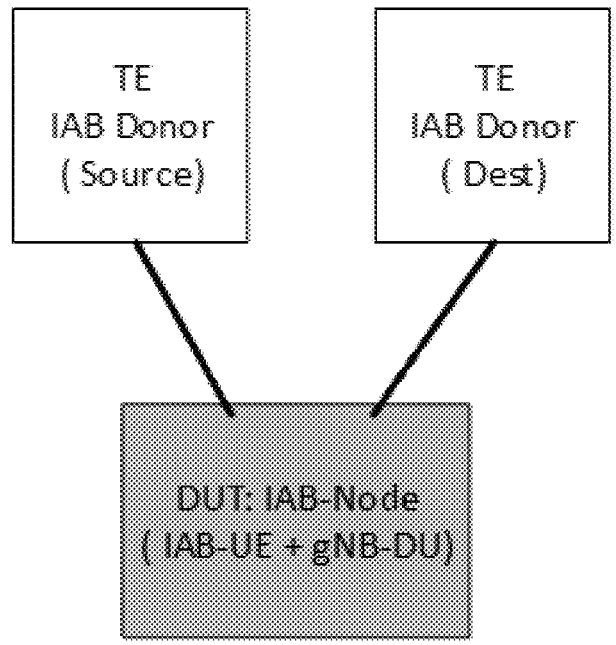
FIG. 3 shows the test system in a fourth test scenario.
FIG. 4 shows an overview illustrating the configuration of a device under test in a test scenario.

In FIG. 4, the respective configuration of an embodiment of the distributed unit module 24 is shown. It is shown that the configuration encompasses a communication direction, for instance Downlink ("D"), Uplink ("U") or Flexible ("F"), and/or an availability attribute, for instance Hard ("H"), Soft ("S") or Not Available ("NA"). Furthermore, it is indicated whether or not the respective configuration of the soft resources is static ("-") or dynamic ("A"), namely whether dynamic is available or not. In some embodiments, the resources associated with the distributed unit module 24 are configured as Hard, Soft, or Not Available.

The individual configuration is associated with each slot provided by a radio frequency signal used for testing purposes. The radio frequency signal may comprise at least one frame that has ten sub-frames as illustrated in FIG. 4, wherein each of the sub-frames is associated with a dedicated slot.

Since the configuration is at least partially dynamic, the respective configuration of time resources can be changed during the testing. Put differently, the device under test 14 is configured both statically and dynamically. The static configuration defines for each symbol the respective setting of the device under test 14 from the beginning, namely when establishing the connection 16. In contrast to the static configuration, the dynamic configuration provides an indication of availability for the respective soft resources as described above. Accordingly, the device under test 14 is enabled to allocate a downlink transmission and an uplink transmission if a soft resource is indicated as being available as illustrated in FIG. 4.

In any case, the test equipment 12 gathers reception information since the device under test 14 configured appropriately communicates with the test equipment 12, for example the participant 20 simulated.

The test equipment 12 is also configured to combine the configuration information with the reception information in order to verify correct resource utilization of the device under test 14. Thus, the test equipment 12 is generally enabled to verify whether the multiplexing was carried out correctly by the device under test 14.

Moreover, a second test scenario may be performed that comprises radio frequency testing of the device under test 14 when the backhaul link 26 and the access link 28 are on different bands of the connection 16. This second test scenario relates to a frequency division duplex (FDD) testing of the device under test 14 that may also be performed by the test system 10.

Figure 2:
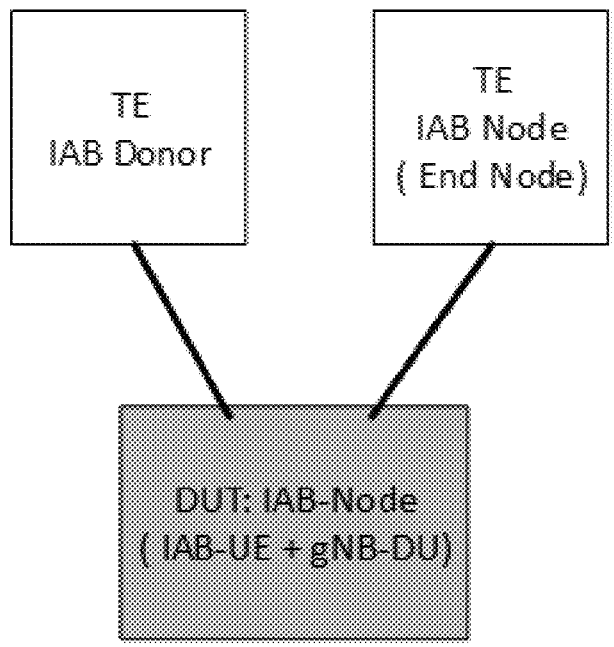
FIG. 2 shows the test system during a third test scenario.

In FIG. 2, a third test scenario is shown that can be performed in order to test data transmission from the at least one Integrated Access Backhaul donor 18 simulated via the device under test 14 to the participant 20 simulated.

As mentioned above, the test equipment 12 simulates the Integrated Access Backhaul donor 18 and the participant 20. However, the participant 20 simulated corresponds to an Integrated Access Backhaul participant, for example a further Integrated Access Backhaul node ("IAB Node") which is also called end node. Hence, the device under test 14 acts as a relay node in the third test scenario.

In FIG. 3, a fourth test scenario is illustrated, in which the participant 20 simulated by the test equipment 12 corresponds to a further Integrated Access Backhaul donor ("IAB Donor"). Thus, the fourth test scenario relates to releasing the backhaul link 26 with the Integrated Access Backhaul donor 18 simulated and establishing a new backhaul link 26' with the participant 20 simulated by the test equipment 12, namely the further Integrated Access Backhaul donor.

The test system 10, for example the test equipment 14, ensures that the device under test 14, namely the Integrated Access Backhaul node to be tested, can be tested appropriately with regard to its characteristics required for backhaul functionality in a simple and cost-efficient manner.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method of testing an Integrated Access Backhaul node, the method comprising:
   providing a device under test as well as a test equipment for testing the device under test, wherein the device under test corresponds to an Integrated Access Backhaul node to be tested;
   simulating at least one Integrated Access Backhaul donor by the test equipment;
   simulating a participant by the test equipment, said participant being connected with the device under test;
   establishing at least one connection between the device under test and the test equipment, wherein a backhaul link is established with the test equipment;
   configuring link resources for the device under test via configuration information by the test equipment;
   gathering reception information by the test equipment; and
   combining the configuration information with the reception information by the test equipment in order to verify correct resource utilization of the device under test,
   wherein the test equipment simulates both the at least one Integrated Access Backhaul donor and the participant that is connected with the device under test.

2. The method according to claim 1, wherein the connection established concerns a radio frequency connection.

3. The method according to claim 1, wherein the device under test comprises a mobile termination module and a distributed unit module.

4. The method according to claim 3, wherein the mobile termination module establishes the backhaul link with the test equipment, and wherein the distributed unit module establishes an access link with the test equipment.

5. The method according to claim 1, wherein the participant simulated corresponds to a user equipment or an Integrated Access Backhaul participant.

6. The method according to claim 5, wherein the Integrated Access Backhaul (IAB) participant is a further Integrated Access Backhaul node or a further Integrated Access Backhaul donor.

7. The method according to claim 1, wherein a first test scenario is performed that comprises radio frequency testing of the device under test when the backhaul link and an access link are on same bands.

8. The method according to claim 7, wherein the first test scenario includes the configuration of time resources of the device under test by the test equipment.

9. The method according to claim 7, wherein the first test scenario includes changing the configuration of time resources.

10. The method according to claim 1, wherein a second test scenario is performed that comprises radio frequency testing of the device under test when the backhaul link and the access link are on different bands.

11. The method according to claim 1, wherein a third test scenario is performed that comprises data transmission from the at least one Integrated Access Backhaul donor simulated via the device under test to the participant simulated, wherein the device under test acts as a relay node.

12. The method according to claim 1, wherein a fourth test scenario is performed that comprises releasing the backhaul link with the at least one Integrated Access Backhaul donor simulated and establishing a new backhaul link with the participant simulated.

13. The method according to claim 1, wherein the device under test is configured both statically and dynamically.

14. The method according to claim 13, wherein a static configuration defines for each symbol the respective setting of the device under test.

15. The method according to claim 14, wherein the static configuration is set when establishing the connection.

16. The method according to claim 13, wherein a dynamic configuration provides an indication of availability for soft resources.

17. The method according to claim 16, wherein the device under test is enabled to allocate a downlink transmission and an uplink transmission if a soft resource is indicated as being available.

18. The method according to claim 1, wherein a radio frequency signal is used for testing the device under test, wherein the radio frequency signal comprises at least one frame, wherein the at least one frame comprises ten sub-frames, and wherein one sub-frame has at least one slot.

19. A test system for testing an Integrated Access Backhaul node, the test system comprising:
   a test equipment and a device under test established by an Integrated Access Backhaul node, wherein the test equipment is at least one radio communication tester, wherein a connection is established between the device under test and the test equipment, wherein the test equipment is configured to simulate at least one Integrated Access Backhaul donor and a participant connected with the device under test, wherein the test equipment is configured to establish at least one connection between the device under test and the test equipment, wherein a backhaul link is established with the test equipment, wherein the test equipment is established to configure link resources for the device under test via configuration information, wherein the test equipment is established to gather reception information, and wherein the test equipment is configured to combine the configuration information with the reception information in order to verify correct resource utilization of the device under test.

20. A method of testing an Integrated Access Backhaul node, the method comprising:
   providing a device under test as well as a test equipment for testing the device under test, wherein the device under test corresponds to an Integrated Access Backhaul node to be tested;
   simulating at least one Integrated Access Backhaul donor by the test equipment;
   simulating a participant by the test equipment, said participant being connected with the device under test;
   establishing at least one connection between the device under test and the test equipment, wherein a backhaul link is established with the test equipment;

configuring link resources for the device under test via configuration information by the test equipment so as to configure the device under test with respect to a test scenario applied;

gathering reception information by the test equipment; and combining the configuration information with the reception information by the test equipment in order to verify correct resource utilization of the device under test, wherein the test equipment gathers the reception information from the device under test, wherein the test equipment combines the configuration information previously transmitted to the device under test by means of the test equipment with the reception information gathered from the device under test by means of the test equipment, and wherein the test equipment verifies the correct resource utilization of the device under test based on the results obtained when combining the configuration information with the reception information.

* * * * *